(12) United States Patent
Cox

(10) Patent No.: US 6,530,333 B1
(45) Date of Patent: Mar. 11, 2003

(54) TREE EXCAVATOR AND TRANSPLANTER

(76) Inventor: Thomas Cox, 15915 Harwick, Spring, TX (US) 77379

(*) Notice: Subject to any disclaimer, the term of this patent is extended or adjusted under 35 U.S.C. 154(b) by 0 days.

(21) Appl. No.: 09/876,908

(22) Filed: Jun. 8, 2001

(51) Int. Cl.[7] .......................... A01G 23/02; A01B 13/00
(52) U.S. Cl. ......................................... 111/101; 37/302
(58) Field of Search .......................... 37/301, 302, 195, 37/466, 187, 188; 111/101, 102, 103, 100, 900; 47/1.01

(56) References Cited

U.S. PATENT DOCUMENTS

| | | | |
|---|---|---|---|
| 3,017,707 A | * | 1/1962 | Sigler et al. .................. 37/302 |
| 4,286,398 A | | 9/1981 | Lemond et al. |
| 4,341,025 A | | 7/1982 | Stocker |
| 4,403,427 A | | 9/1983 | Dahlquist |
| 4,658,518 A | | 4/1987 | Korenek |
| 5,081,941 A | | 1/1992 | Weeks |
| 5,485,691 A | | 1/1996 | Stevens et al. |
| 5,600,904 A | * | 2/1997 | Bowling ....................... 37/302 |
| 6,253,690 B1 | * | 7/2001 | Cox ........................... 111/101 |

* cited by examiner

Primary Examiner—Robert E. Pezzuto
(74) Attorney, Agent, or Firm—Browning Bushman, P.C.

(57) ABSTRACT

An apparatus 10 and method for excavating, transporting, and transplanting a live tree. The invention relates more specifically to equipment, which utilizes curved ground piercing excavation blades 42 moveably supported on a ring assembly 50 that is pivotally supported in a support frame 20. The ring assembly and the support frame may be positioned around the tree and the blades forced into the ground to excavate a root ball which can thereafter be lifted and transported for subsequent transplantation. The ring assembly 50 may be tilted rearward to permit transporting the tree in a rearward inclined or tilted position, such that wind an obstacle damage to the branches and limbs may be reduced as compared to forward tilting movers. In addition, the rearward tilt may accommodate tilting relatively tall trees at angles of up to 90 degrees from vertical, in order to transport the tree under relatively low over-head clearance obstacles, such as bridges, other trees, and porta cocheres. An improved blade keel 40 assembly is provided which saves time and costs, as compared to prior art assemblies.

20 Claims, 4 Drawing Sheets

TREE EXCAVATOR AND TRANSPLANTER

FIELD OF THE INVENTION

This invention generally relates to apparatus and methods for excavating and transplanting trees. The invention relates more specifically to equipment which utilizes curved ground piercing blades moveably supported on a ring assembly positioned around a tree to be transplanted, the blades being forced and guided down into the ground to completely encompass a tree root ball which can thereafter be lifted out of the ground and transported for subsequent transplantation. In addition, this invention relates to equipment for inclining the tree at an angle to permit transporting large trees down public roadways having overhead obstacles, such as electrical lines and overpasses.

BACKGROUND OF THE INVENTION

Land developers are becoming more interested in trying to save trees on the land they are developing. In fact, some communities, such as Austin, Tex., have an ordinance protecting trees 19 inches in diameter or larger. Since such trees are usually in the way of the planned construction, they must be moved to another location on the site or elsewhere. For the trees to have a reasonable chance of surviving, a substantial root ball must be moved with the tree.

Previous tree moving equipment, such as the DeHaan device, U.S. Pat. No. 4,226,033, the Lemond device, U.S. Pat. No. 4,286,398, the Newman device, and U.S. Pat. No. 4,301,605, the Stocker device, employed a plurality of blades that severed the root ball from the ground and formed a supporting structure for the root ball and tree as it was lifted out of the ground and moved to its new location. The blades were guided into the ground by various types of guide members that engaged the blade over a substantial portion of their length. This resulted in significant structure high above the ground. This structure is a disadvantage to utilizing the prior art equipment, such that trees with low limbs frequently required the limbs to be removed in order to be transplanted.

The Korenek tree transplanter, U.S. Pat. No. 4,658,518, attempted to alleviate this problem, but it also has its disadvantages. Use of the Korenek equipment can be limited when utilized on terrain that is not level because the mast requires the ring assembly, tree and root ball to be raised vertically. The problem may become evident when the apparatus is utilized on terrain having more than minimal slope, such as that exceeding 10 degrees. Many applications require the transplantation of a tree either from or to a terrain that has a significant slope, such that the blades of the previous equipment might not be properly aligned with the axis of the tree, thereby resulting in excavating a root ball insufficient to protect the tree and ensure successful transplantation. Since the ring structure and blades are set in a given plane in relation to the terrain, the Korenek equipment may not allow the excavation of a tree and adequate root ball from severely sloped terrain, such as the side of a mountain. Further problems may arise with the Korenek equipment when the tree to be excavated and has a crooked trunk or significant branches which the mast would interfere with, such that in positioning the transplanting apparatus around the tree, the trunk may force the misalignment of the ring structure and blades in relation to the root ball, resulting in the excavation of an inadequate or asymmetrical root ball, and thereby sacrificing the health of the tree and decreasing the likelihood of successful transplantation.

The Korenek apparatus includes a mast on which a ring structure vertically raises and lowers in relation to the ground. The mast stands in a strictly vertical plane and may interfere with the limbs of large trees, possibly injuring the tree limbs or requiring the removal of several tree limbs in order to accurately position the apparatus around the tree. Further, this problem makes such devices particularly disadvantageous for use in nurseries where it is desirable to plant and cultivate trees as closely as possible to utilize the available land most efficiently. Because of the space required for maneuvering and positioning conventional devices to remove such trees, the trees must be planted a greater distance apart than would generally be desirable from the standpoint of utilizing available space in the most efficient manner possible.

Additionally, those skilled in the art have learned that the mast arrangement is often not strong or rigid enough to use the apparatus with large trees, such that additional braces have been attached between the mast and various points on the ring structure. These additional supports may also interfere with the limbs of the tree to be excavated, resulting in the need to again remove several limbs prior to excavation. To desirably position the ring assembly of the Korenek device for a tree excavating operation, the lower end of the mast is closely adjacent the ground surface. This close spacing e.g., approximately 8 inches, presents ground clearance problems when using the equipment, particularly in muddy environments.

Moreover, once a tree is excavated with the Korenek equipment, the weight of the excavated tree bears substantially upon the mast. To counteract the moment about the mast created by the excessive weight of the tree, a particular prime mover must be selected to prevent the mast from breaking and to prevent the excavated tree from falling backwards to the ground. This limitation in selecting a prime mover of appropriate weight to prevent such malfunction is particularly disfavored to those skilled in the art, since many applications have limitations in the availability of prime movers of various weights.

The Korenek apparatus is also susceptible to malfunctions attributed to wear and fracture of the blade guides which guide the blades into the ground. The guides in the Korenek apparatus receive excessive loading from the blades, a problem intensified by the minimal contact area between the blades and the guides. This loading creates excessive wear on the guides, resulting in the failure of the guides or blades, and thereby driving up maintenance requirements of the apparatus, decreasing the reliability of the device, and ultimately increasing operating costs of the device. The guides also provide no effective means for removing debris that becomes lodged between the guides and the blades during use, a factor that leads to further malfunction or fracture of the apparatus. Also, as the Korenek transplanting apparatus is repeatedly used and the force of the blades on the guides and debris accumulates between the guides and the blades, significant wear is effected on the guides, such that the engagement of the guides and the blades is lessened, thereby preventing the blades from being accurately driven into the ground. This also results in the inadequate excavation of the root ball and diminishes the likelihood of tree survival.

Finally, utilization of the Korenek tree transplanter can be a tedious process, requiring multiple bolting and unbolting of the ring sections to and from one another. Since tree excavating apparatus are often utilized in the construction and nursery industries where time is of the essence, a tedious procedure is not cost effective. Utilizing this equipment requires the additional utilization of multiple tools and several people, thereby increasing both the complexity, execution time and cost of excavating a single tree.

Prior art tree excavators have used hydraulic cylinders each secured to a blade and to a fixed member, such as an annular ring member or a blade guide. Blades are individually inserted into the ground from forces provided by these cylinders. In many prior art tree excavation equipment, the cylinders are rather lengthy, such that the blade may be moved from a fully retracted position to a completed excavation stroke with a full stroke of the linear motor. Thereby, the linear cylinders are rather lengthy and extend upward from the fixed member, creating further height limitations problems, frequently necessitating removal of low hanging branches and limbs from the tree. U.S. application Ser. No. 09/477,513 discloses a tree excavator providing relatively shorter hydraulic cylinders, and includes a series of holes along an outer, longitudinal length of each blade for sequentially connecting, disconnecting and reconnecting the cylinder as the blade is inserted into the ground. A pin and clevis arrangement is disclosed for removably securing the cylinder to the blade. However, such apparatus requires significant time and manual labor to connect, disconnect, and reconnect each cylinder on each blade, both when the blades are inserted to excavate the tree, and when the blades are subsequently moved in the opposite direction to replant the excavated tree.

When excavating and transporting relatively tall trees, clearance under obstructions along the transportation route, such as overhead power lines and roadway overpasses, can be problematic. With some prior art tree transplanting equipment, an excavated tree may be tilted as an angle with respect to the ground, in a direction toward the truck or prime mover. Thereby, the maximum permitted angle of inclination for the tree is limited by interference of the tree trunk, limbs, or branches with the prime mover.

An additional problem with tilting prior art tree moving equipment is encountered when transporting the tree over large distances or at higher speeds, such as on highways. The prior art equipment tilts the tree forward, toward the truck or prime mover and in the direction of transport. The forward inclination of the tree unfavorably positions the branches with respect to wind and obstacles encountered by the tree. Thereby, encountered obstacles and/or high wind tend to bend the branches backward, toward the base of the tree, which may result in hanging the branches and limbs on the obstacle and/or breaking the limbs or branches. At roadway speeds, the wind loading on a tree angled forward into the wind may also create sizeable stress and forces on the tree as the limbs are bent downward. Limbs, branches, and/or foliage thereby may be relatively easily broken or damaged.

Another problem with transporting relatively tall trees at an inclination over roadways using prior art equipment is decreased verticle clearance under obstacles, such as portacocheres or electrical lines, due to the base of the tree being carried or positioned above a vehicle axle and/or wheels. Thereby, trees exhibiting large diameter root balls and/or large diameter upper portions may incur relatively low clearance obstacles during transportation, which may necessitate removing branches or the obstacle.

In U.S. Pat. No. 4,403,427, Dahlquist discloses a truck mounted tree planter which transports a tree inclined forward, positioning the branch and limb portion of the tree toward and over the truck cab. In addition, the root ball is supported above the truck rear frame and axles, limiting verticle clearance. U.S. Pat. No. 5,081,941 to Weeks discloses a loader mounted apparatus for excavating and transplanting trees. The Weeks transporter is limited in its ability to transport large trees in highly inclined positions, and is not well suited for long-distance or roadway transportation.

In U.S. Pat. No. 5,485,691, Stevens discloses a tree excavating and transporting apparatus which also imposes height limitations and clearance problems for large trees, in that the root ball is positioned above the transporter's axle. In addition, the tree is inclined forward, in the direction of travel and toward the prime mover. Thereby, potential transportation problems are imposed, including branches being broken due to wind and engagement with obstructions, and engagement of taller trees with the prime mover, imposing potential height clearance problems.

U.S. Pat. No. 4,341,025 to Stocker also discloses a truck mounted tree transporter, which inclines the tree forward over the cab of the truck, imposing minimum clearance problems for large diameter trees and relatively low hanging obstructions. The previously discussed problems of forward inclining the tree are also inherent with this apparatus.

It is highly desirable to provide a tree excavating and transplanting apparatus that can transplant relatively large trees down roadways with reduced damage to the tree. It is also highly desirable to transport relatively large trees under relatively low height clearance obstructions, such as power lines, porta-cocheres, and bridges. It is desirable to tilt a tree rearward at up to 90 degrees while transporting the tree, relative to the vertical trunk position, to minimize wind and obstruction damage to the tree.

SUMMARY OF THE INVENTION

A preferred machine for excavating and transplanting large trees involves a tilting annular ring assembly pivotally supported in an supporting frame. The tilting annular ring assembly may support a plurality of blades moveably supported thereon. The annular ring assembly and the supporting frame are positioned around a tree by a prime mover. The blades sever a root ball from the ground and form a supporting structure for the root ball and tree as it is lifted out of the ground, tilted rearward with respect to the prime mover, and moved to a new location. Typically, the annular ring assembly includes a front rigid section and one or more rear gate sections pivotally attached to the rigid section, such that the gate sections can be rotated open to allow the machine to be positioned around the tree.

The present invention provides a machine and method for excavating and transplanting large trees, and affords solutions to some of the challenges of excavating and transporting trees experienced in the prior art. This invention offers advantages over the prior art in that it may improve excavation of trees from and transplantation of trees to uneven or sloped terrain, while maintaining the tree in a gravitationally plumb posture. This machine permits tilting a front or rear portion of the support frame with respect to the other, while additionally permitting tilting of the blade-supporting annular ring assembly with respect to the supporting frame. Thereby, the present invention permits additional machine flexibility and positioning options for operations on uneven or sloped terrain.

A primary object of this invention is to provide a tree mover that can tilt relatively large trees rearward with respect to a prime mover at the front of the machine. Thereby, the tree may be transported under relatively low-clearance overhead obstructions, and may additionally minimize wind and obstruction damage to limbs and branches, compared to prior art machines. The invention may also substantially improve the tree excavating and transplanting process, such as by eliminating the need for removing overhead obstacles, or permitting access to transplanting areas which may previously have been inaccessible due to such obstacles. Tilting the tree rearward, away from the prime mover, permits tilting a relatively tall tree at angles of up to 90 degrees, without interference or engagement with the prime mover, as experienced with prior art tree movers. Branches tilted rearward may be less prone to breaking due to the wind and obstacles encountered during transport, as compared to trees tilted forward, toward the wind and obstacles.

Another primary object of this invention is to provide an excavating machine that offers the ability to excavate, transport, and transplant large trees, including relatively tall trees, and to further improve such excavating and transplanting operations on uneven or sloping terrain. The preferred embodiment disclosed affords this characteristic through the arrangement of four hydraulic elevating cylinders engaged with the support frame and three moveable base supports. Two elevating cylinders are each pivotally attached at one end to the support frame which pivotally supports the blade carrying annular ring assembly, and are each attached at the other end to one of the two moveable rear base supports. Two front elevating cylinders may be pivotally attached at one end to the support frame and at another end to an over-center neck mechanism, which in turn may be pivotally attached at one end to the support frame and at an opposing end to a front moveable base support. The three moveable base supports may be supported upon one or more axles, tires, wheels, and/or tracks, to make the moveable supports rollable supports, such that a prime mover may move the tree mover apparatus.

The two rear hydraulic elevating cylinders are each attached at an opposing end to a respective moveable base. By extending the elevating cylinder pistons to different lengths to best position the ring assembly around the tree, the ring assembly may maintain a substantially level position with respect to the terrain. However, due to the dimensional distances between the moveable base supports, on highly uneven terrain, additional vertical positioning of the blades is desirable. Such improved positioning is achieved through this invention by pivotally supporting the annular ring assembly within the support frame. Thereby, the blades and annular ring assembly may be further aligned with respect to the terrain and tree trunk position by pivoting the annular ring with respect to the support frame. The likelihood of tree survival may be increased since pivoting the annular ring with respect to the support frame may permit excavation of a more accurately excavated root ball than previously possible with the prior art.

This invention may also utilize a plurality of relatively shorter length blade movers/hydraulic cylinders to better position the tree mover around tree trunks having relatively low hanging limbs and branches. With tree movers utilizing long-stroke hydraulic cylinders, such limbs and branches frequently require removal in order to position the tree mover around the tree trunk. However, use of prior art short stroke hydraulic cylinders is relatively time consuming and labor intensive to reposition each cylinder in order to make subsequent steps or stokes for blade movement.

It is a feature of this invention to reduce the time required excavating and transplanting a tree using a tree mover apparatus utilizing a plurality of the shorter, relatively low-clearance hydraulic cylinders. An improved keel assembly and method of operating the cylinders is provided by the present invention, reducing the labor and time required to reposition each of the hydraulic cylinders between stokes.

In a preferred embodiment, a keel is provided on each blade along an inside surface of the circumference formed by the plurality of ground piercing blades. Each keel may be provided with a plurality of keel slot profiles, each designed for laterally engaging a lower end of a hydraulic cylinder. An upper end of each blade moving hydraulic cylinder may be pivotally positioned relative to the lower end such that the cylinder may be pivoted slightly along a pendulum-like arc into engagement with or from engagement with a selected keel profile. These features are favorable over the prior art in that workers may efficiently operate the tree mover apparatus in a timely fashion, eliminating time consuming hydraulic cylinder removal and reattachment to each keel, following each cylinder stoke of the relatively short hydraulic cylinder. These features are also advantageous over the prior art in that they may decrease the number of additional tools necessary to repeatedly attach the blade movers to the ground piercing blades.

The forgoing disclosure and description of the machine for excavating and transplanting large trees and components is illustrative and explanatory thereof. This invention is not intended to be limited to the illustrated and discussed embodiments, as one skilled in the art will appreciate that various changes in the size, shape and materials, as well as in the details of the construction and combinations of features of the tree excavating, transporting and transplanting machine may be made without departing from the spirit of the invention.

DETAILED DESCRIPTION OF PREFERRED EMBODIMENTS

Figure 1:
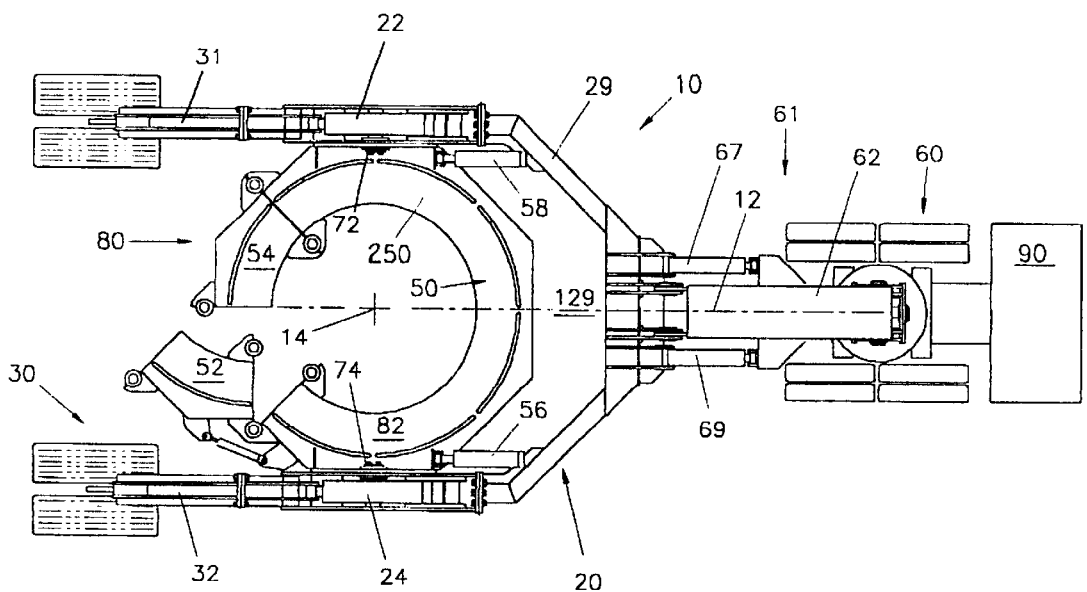
FIG. 1 is a simplified top view of the tree excavator and transplanter with the plurality of blades removed for clarity, and illustrating the frame in a lowered position relative to the base.

The attached drawings are provided for reference purposes only, for demonstrating preferred embodiments, and not for the purpose of limiting the invention. FIGS. 1, 2, 3, 4 and 5 are simplified illustrations of an embodiment of a tree excavating and transplanting apparatus 10 according to the present invention. A tree mover apparatus according to the present invention includes an annular ring assembly 50 pivotally supported in a support frame 20. The support frame 20 is pivotally supported on a base 30, preferably including rear base members 31 and 32, and front base 60. Front base 60 preferably includes front leg 62. Each of the base members 31, 32, 60 pivot relative to the frame 20. The support frame 20 is preferably generally U-shaped and the annular ring assembly 50 includes at least one gate section on a rearward portion of the ring 50, such that the rear opening 80 of the ring 50 and support frame 20 may be positioned around a tree trunk. The gate may then be closed, thereby encircling the tree trunk with the annular ring 50.

Figure 2:
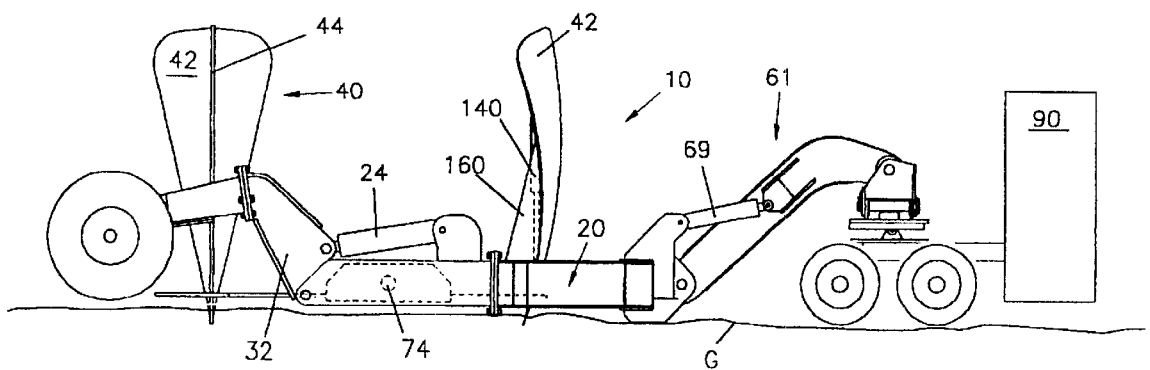
FIG. 2 is a simplified elevation view of FIG. 1, showing the apparatus with the support frame in a lowered position and including an over-frame neck pivotally positioned on a rollable front base, such as a powered vehicle, and further illustrating one blade on the annular ring and one blade on a rearward opened gate, with all other blades removed for clarity.
Figure 3:
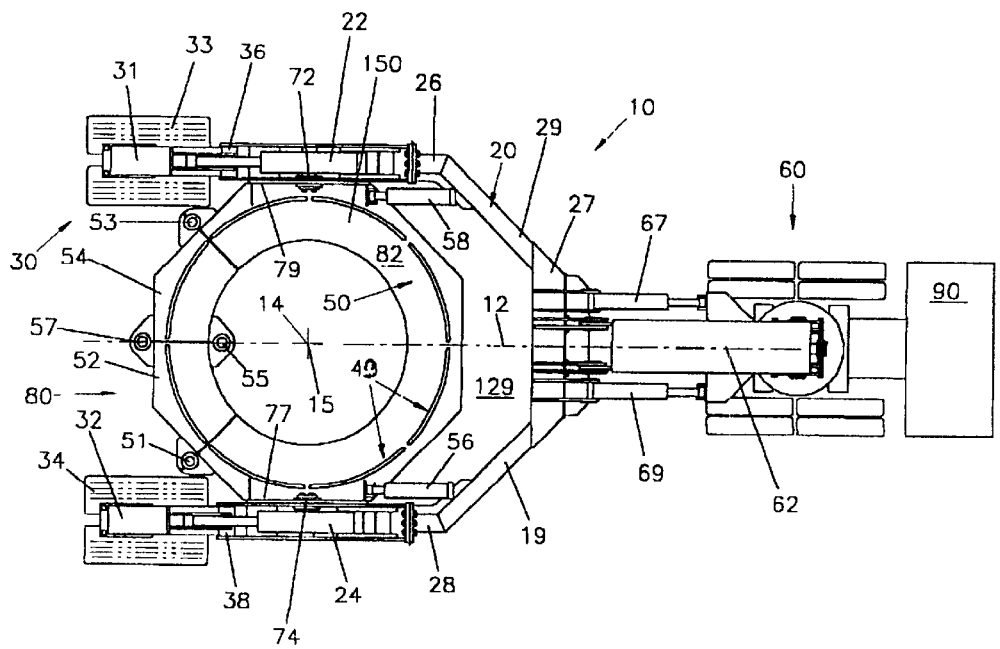
FIG. 3 is a simplified top view of the apparatus with the gates closed, with the plurality of blades removed for clarity, and the annular ring and support frame elevated relative to the base.
Figure 4:
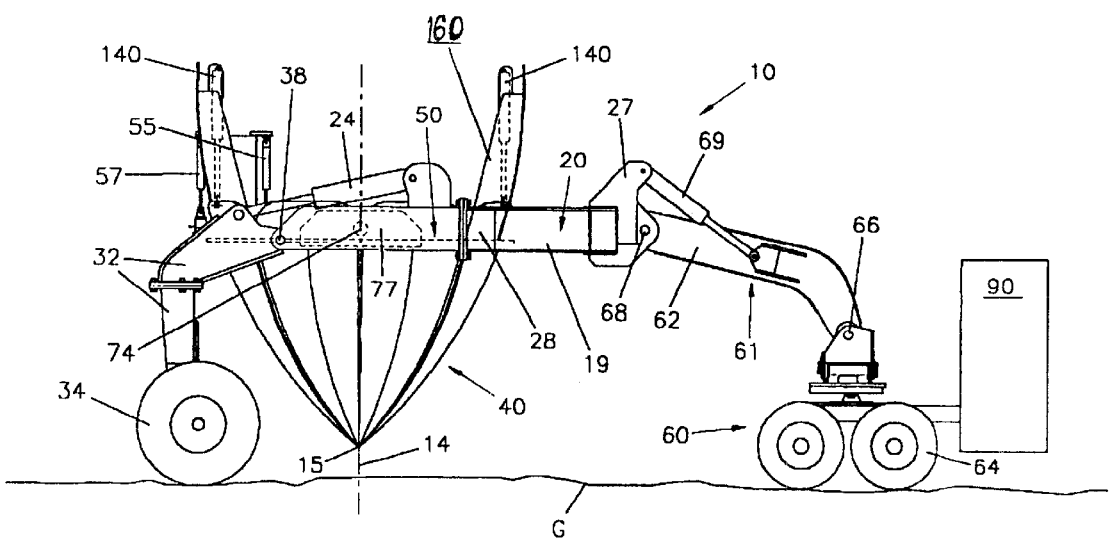
FIG. 4 is a simplified elevation view of the apparatus from FIG. 3, with the annular ring assembly in an elevated or raised position and the plurality of blades in a fully closed position.
Figure 5:
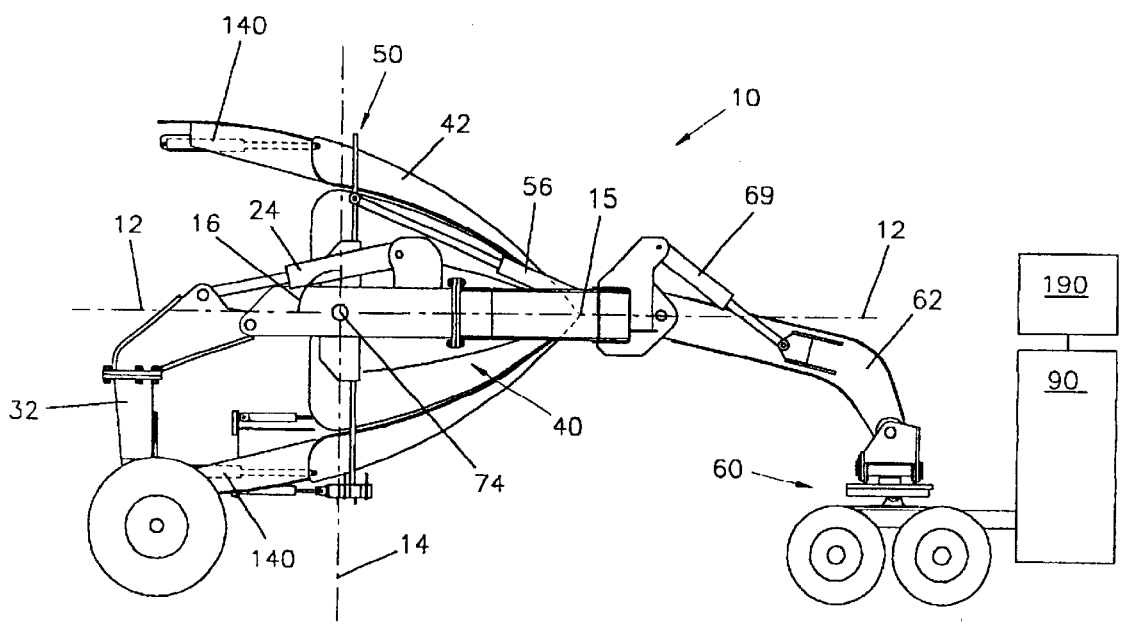
FIG. 5 is a simplified elevation view of the apparatus shown in FIGS. 3 and 4, with the annular ring assembly in an elevated position and tilted rearward at approximately 90 degrees.

As illustrated in FIGS. 1 and 2, the support frame 20 and annular ring 50 may be positioned around a tree and then lowered to near ground-level G. Thereafter, a plurality of blades 40 positioned circumferentially around the annular ring 50 may be forced in the ground G to excavate a root ball from the ground. After the plurality of blades 40 are lowered into the ground under the root ball, the support frame 20 may be elevated to the raised position as illustrated in FIGS. 3 and 4, by pivotally moving the frame relative to the base 30. As illustrated in FIG. 5, the tree may thereafter be tilted rearward for transportation to an objective site for replanting. In tilting the tree and root ball rearward, in one embodiment, the annular ring 50 is pivoted relative to the frame 20 and relative to the base 30.

A prime mover 90 may provide the driving power for moving the apparatus. The term prime mover as used herein may be defined broadly to encompass a variety of engine and/or vehicle arrangements. In a preferred embodiment, the prime mover 90 is positioned at an axially forward portion of the apparatus 10, opposite the rear opening 80. For example, the prime mover may be a truck or similar vehicle, or a single-axle prime mover such as commonly used on articulating earthmovers. Positioning references herein made with respect to the prime mover 90 refer to embodiments having the prime mover positioned near an axially forward end of the apparatus, as illustrated in FIGS. 1 through 5. The rearward end of the apparatus 10 may be defined as the end and preferably including the opening 80 for positioning the apparatus 10 around the tree by moving the apparatus in a rearward direction.

Referring to FIGS. 1–5, a preferred embodiment of a tree mover apparatus 10 may include a moveable base 30 having a base centerline 12, generally axially aligned with the prime mover 90 to accommodate moving the apparatus 10. The base 30 may include left side rollable base supports 31 on a respective left side of the base centerline 12 and right side rollable base supports 32 on a respective right side of the base centerline 12. The left side 31 and right side 32 rollable base supports may include leg members such as illustrated in FIGS. 1 through 5, and may further include a wheel arrangement 33, 34 or a track arrangement. The base 30 is pivotally connected to the support frame 20 to facilitate raising and lowering the frame 20 and ring 50 relative to the base 30.

A significant feature of the invention is that the elevation of the annular ring 50 relative to the ground surface may be selectively altered by pivoting the base 30 and 60 relative to the frame 20. In a preferred embodiment, the frame 20 and ring 50 may be lowered until the frame 20, ring 50, or lower ends of the blades engage the ground surface. During lowering, the front base 60 may roll in a forward direction while the rear base 30, including supports 31 and 32 roll in a rearward direction. Thereafter, the blades may be inserted in to the ground to excavate the tree.

After excavation, the ring 50 and frame 20 may be elevated to an elevated position relative to the ground to transport the excavated tree. During elevation, the front base 60 may roll in a rearward direction while the rear base 30, including supports 31 and 32 rolls in a forward direction. Each of the rear base members 31 and/or 32, and the front base 60 may be pivoted independently of the other members such that the ring 50 may be maintained at a level attitude, particularly on inclined surfaces. In like fashion, the ring 50 may be tilted from side-to-side, as well as front to back. The position of an excavated tree, or of the ring and/or frame, may be selectively maneuvered to the left, right, front, rear, or any combination thereof.

In a preferred embodiment, the rollable base 30 may also include a front rollable base support 60 pivotally connected to the support frame 20. An over-center neck mechanism 61 may pivotally connect the front rollable base 60 and the support frame 20. A pair of over-center neck hydraulic cylinders 67, 69 may be provided for pivoting the over-center neck mechanism to elevate the support frame 20 relative to the front base 60. A front pivot brace member 27 may provide a mechanical advantage for each of the cylinders 67, 69 to pivot the over-center neck mechanism 61 relative to the base 30.

The support frame 20 is pivotally connected to the left side rollable base support 31 by pivot 36 and to the right side 32 rollable base support 32 by pivot 38. The frame 20 may include left-side frame leg 26, right side frame leg 28, and cross members 19, 27, 29, and 129 to connect the side legs 26 and 28. The left side 31 and right side 32 rollable base supports, and the front rollable base support 60, each may be movable along the base centerline 12 relative to the support frame 20. Preferably the rear rollable base supports 31, 32 are rollable along the base centerline 12 with respect to the front rollable base supports 60, as illustrated by comparing the component pivotal positions of FIG. 2 with FIG. 4.

The annular ring assembly 50 may be pivotally supported on the support frame 20, and more particularly on side legs 26 and 28 by pivots 72 and 74, such that the annular frame member 50 may be tilted or pivoted rearward. The annular ring assembly 50 may include a rigid ring portion 250 supporting one or more rearward pivotal gate sections 52, 54 thereon to facilitate positioning the annular ring assembly 50 circumferentially around the tree. The annular ring 50 may also include pivot mounts 79 and 77 secured to the rigid portion 250 to support the pivots 72 and 74 in the annular ring 50. In a preferred embodiment, a pivot axis may pass through pivots 72,74, and ring vertical axis 14, wherein the ring assembly 50 may be substantially neutral biased with respect to tilting forward or rearward, such that without selective tilting, a tree trunk may be positioned substantially along vertical tree trunk axis 14, illustrated in FIG. 4.

In a preferred embodiment, a pair of hydraulic tilting cylinders 56, 58 may be pivotally connected to each of the support frame 20 and the annular ring 50. The cylinders 56, 58 may selectively tilt the annular ring 50 relative to the base, from a vertical tree trunk position 14 to a rearward inclined tree trunk position, such as illustrated in FIG. 5. Thereby, the tree may be transported with the tree trunk and branches tilted rearward during transport and to permit moving the tree under relatively low clearance overhangs. When positioned for transplantation, the tilted tree may be repositioned back to vertical by the cylinders 56 and 58. FIG. 5 illustrates the annular ring assembly 50 positioned at a substantially 90-degree angle with respect to vertical 14. Arc 16 between axes 12 and 14 illustrate the 90-degree tilt angle. Preferred embodiments may permit tilting the tree at least 60 degrees with respect to a substantially gravitationally plumb axis 14, with the ability to tilt the tree to a full 90-degree tilt, as illustrated in FIG. 5. Other embodiments may favor tilting the tree at least 45 degrees relative to plumb axis 14, while still other embodiments may tilt preferably at least 75 degrees relative to axis 14.

For preferred embodiments, in addition to permitting tilting a tree rearward for transport, pivoting ring 50 relative to the frame 20 permits excavating a tree with the frame 20 and base 30 positioned on an inclined slope or irregular ground surface G. Thereby, a tree may be excavated from or transplanted to a sloped terrain or ground G, with the ring 50 positioned substantially perpendicular to the plumb axis 14, while the frame 20 and/or base are inclined along a ground slope.

For selectively raising and lowering the frame 20 and annular ring 50 with respect to the base, a preferred embodiment may include a hydraulic elevating cylinder 22 and 24 on each of the left side 31 and right side 32 rollable base supports. The base supports may pivot about pivots 36 and 38 to raise the frame 20 and ring 50. In addition, a pair of hydraulic cylinders 67 and 69 may permit the over-center neck mechanism to substantially simultaneously raise a front portion of the frame 20 and ring 50 while the left 31 and right 32 rollable base supports are raised, such that the frame 20 and ring 50 may be raised at a substantially level posture/attitude, which is substantially perpendicular with respect to a plumb axis 14.

In one embodiment, the support frame 20 may be generally U-shaped, having a right side leg on a right side of the base centerline 12, a left side leg on a left side of the base centerline, and a rearward opened portion 80 to position the support frame 20 around a tree trunk. In addition, the annular ring assembly 50 may include at least one gate section 52, 54 pivotally supported by pivots 51, 53, on a rearward portion of the ring 50, such that the ring 50 and support frame 20 also may be positioned around the tree trunk. The gate sections 52, 54 may be secured to each other at connectors 55, and may further include connector hydraulic cylinders 57. After positioning the frame 20 and ring 50 around a tree trunk, the gates 52, 54 may thereafter be closed and the tree thereafter excavated and transplanted.

A plurality of ground piercing blades 40 may be circumferentially arranged about the annular ring assembly 50. Each blade may have a radius of curvature along a longitudinal axis 141, from an upper end of the blade to a lower blade apex 15, at center axis 14, such that the plurality of blades may be guided by the annular ring assembly 50 to move downward and inward relative to the annular ring and into substantially circumferential engagement under the tree to sever a root ball of the tree from the ground. Thereafter, the plurality of blades 40 may support the tree and root ball as the annular ring assembly 50 and the plurality of blades 40 are elevated with respect to the base or ground to lift the tree and root ball from the ground for transportation.

Figure 6:
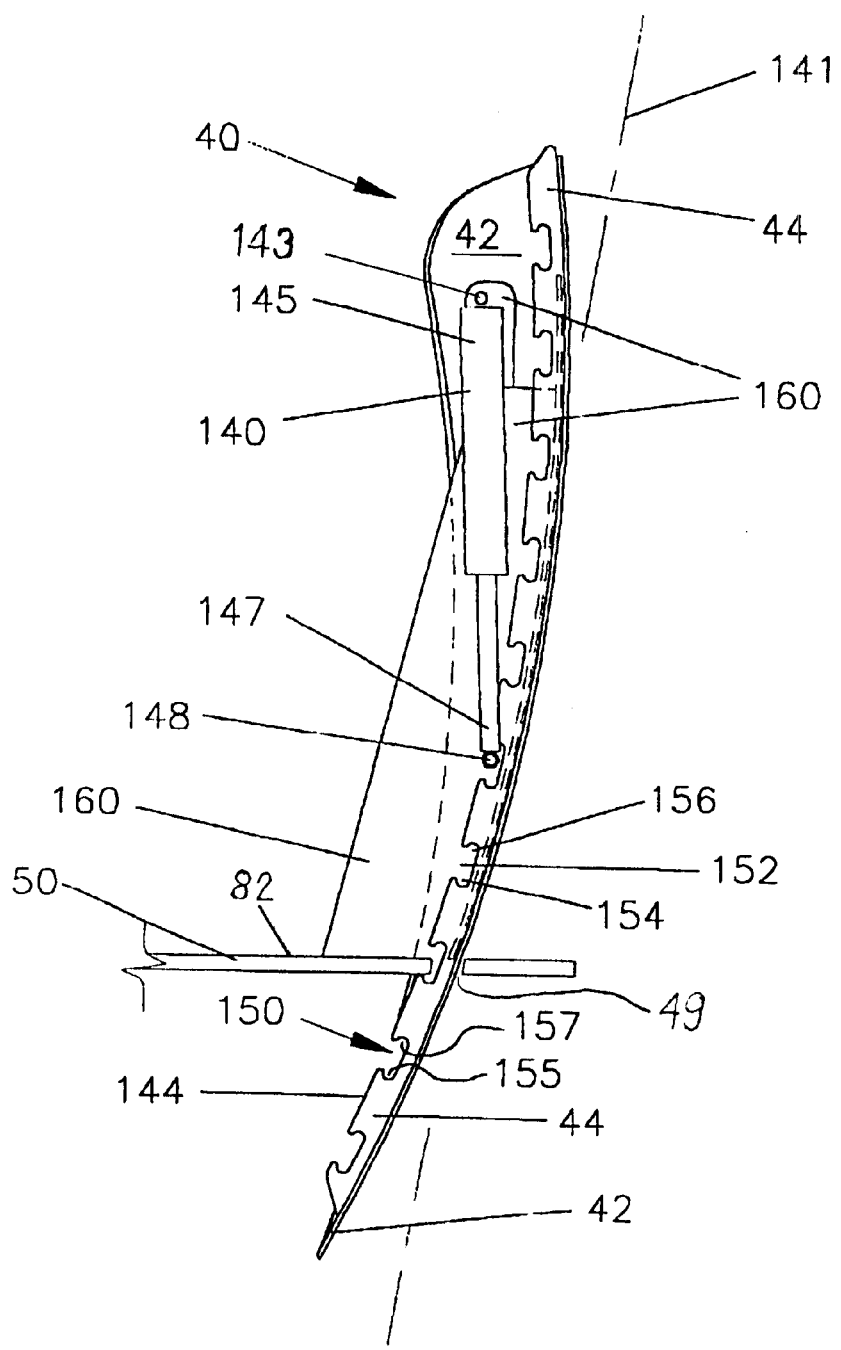
FIG. 6 is a simplified side view of one of the plurality of ground piercing blades and keel combinations, illustrating the longitudinal keel with a plurality of keel slot profiles along an inside surface of the keel for laterally receiving an end of a hydraulic blade cylinder.

Referring to FIGS. 2, 4, and 6, a plurality of hydraulic blade movers 140, preferably hydraulic cylinders, may be provided to each move a respective blade 42 relative to the annular ring assembly 50, in an upward or downward direction, through respective ring slots 49. A downward blade movement may cause excavation of the root ball from the ground, while an upward movement may move the blades from under the root ball, such as when transplanting the tree. FIG. 6 illustrates a side view of a blade cut longitudinally along the keel to illustrate an embodiment of a blade and keel arrangement. The annular ring member 50 may support a vertically positioned cylinder mast 160 to position and support a hydraulic cylinder connected thereto for engagement of the cylinder with a selected one of a plurality of keel slot profiles 150 in the blade keel 44.

In one embodiment, as illustrated in detail in FIG. 6, each of the plurality of ground piercing blades 40 includes a longitudinal keel 44 positioned along a length of the blade. Each keel 44 may include a plurality of keel slot profiles 150 spaced along the longitudinal length 141 of the longitudinal keel 44. At least one blade 42 may be secured to each keel 44, extending circumferentially outward from the keel 44, such that the plurality of blades 40 are substantially circular in shape, as illustrated in FIGS. 1 and 3. In a preferred embodiment, each blade 40 may include a pair of blade halves, with each half secured to an opposing side of the keel 44, as illustrated in FIG. 2, by the blade assembly 40, positioned on an opened gate portion 52, illustrated in FIG. 1.

Referring to FIG. 6, in a preferred embodiment, each of the plurality of hydraulic blade movers 140 is a hydraulic blade cylinder removably engaged at one end 147 to one of the plurality of keel slot profiles 150. Each of the plurality of keel slot profiles may be positioned along an inner, surface 144 of the keel 44. The one end 147 may be positioned within the profile 150 by passing laterally, through a receiving profile 152 and then downward slightly into a lower slot 154 to engage a lower engagement surface 155, or upward slightly into an upper slot 156 to engage an upper engagement surface 157. The keel-engaged end 147 of the blade mover 140 may include an engagement member 148 to engage the engagement surface 155 or 157. An opposing end 145 of the hydraulic blade cylinder 140 may be pivotally attached to the annular ring assembly 50, such as via mast 160. To move one of the plurality of blades from a blade retracted position to a blade extended to excavate a root ball, the blade mover 140 may engage one of the plurality of profiles 150 with the cylinder in a piston retracted position. The blade mover 140 may be activated to extend the piston to a piston extended position, causing engagement member 148 to engage the profile lower engagement surface 155.

When the blade mover 140 is extended to a fully extended position, the cylinder 140 may be retracted slightly to disengage member 148 from surface 155. The extended end 147 of the cylinder may be removed laterally from the profile 150 by pivoting the blade mover 140 about pivot 143, and laterally through receiving profile 152, without requiring unbolting or unpinning the engagement member 148 from the keel 44. Thereafter, the extended end 147 may be retracted into the blade mover 140 and then pivoted again to laterally move engagement member 148 into engagement with another keel slot profiles 150. The step-by-step process of engaging, extending, disengaging retracting, re-engaging and re-extending may be repeated for each of the plurality of ground piercing blades 40 until each of the plurality of blades 42 is in a fully extended position under a tree root ball.

Each keel slot profile 150 is designed for laterally engaging a lower end 147 of a blade mover/hydraulic cylinder 140. The upper end 145 of each blade mover 140 may be pivotally positioned relative to the lower end 147 such that the blade mover 140 may be pivoted slightly along a pendulum-like arc into engagement with or disengagement from a selected keel slot profile 150. These features are favorable over the prior art in that workers may operate the tree mover apparatus in a more efficient fashion, eliminating individual cylinder removal and reattachment to each keel, following each cylinder stoke. Thereby, costs in time, labor, and tools required to excavate a tree are reduced as compared to prior art.

After the plurality of blades 42 are positioned at apex 15, under the tree and root ball, each of the plurality of blade mover pistons 140 may be secured in such configuration by secondary locking or securing members. Chains and/or additional tie-down equipment may be used to secure the tree and root ball to the apparatus. The elevating cylinders 22, 24, 67, and 69 may be actuated to elevate the frame 20, the annular ring assembly 50, and the excavated tree and root ball relative to the base 130, to lift the tree and root ball from the ground, as illustrated in FIG. 4. During and/or subsequent to elevating the root ball, the tilting cylinders 56, 58 may be actuated to tilt the annular ring member 50, to accommodate changes in ground profile or slope as the tree mover is moved with the tree. The tree also may be tilted rearward to accommodate transporting the tree and/or moving the tree under relatively low clearance obstacles.

In a preferred embodiment, a longitudinal keel 44 is positioned along a longitudinal length of a respective blade 42 and radially inside a circumference formed by the plurality of ground piercing blades, such as illustrated in FIG. 6. Similarly, the blade mover mast 160 may also be positioned radially inside the circumference formed by the plurality of ground piercing blades. A plurality of masts 160, each for a corresponding one of the plurality of ground piercing blades, may be secured to an upper surface 82 of annular ring assembly 50 and to a similar upper surface on gates 52 and 54. The receiving profiles 152 for the keel slot profiles 150 may be positioned along a radially inward surface of the keel 44, such that one end of the blade mover 140 may be moved laterally into and from within the keel profile 150, by pivoting along a path-line extending radially outward from centerline 14 to a respective keel 44. Thereby, a preferred embodiment may utilize an inside keel, as opposed to an outside keel.

In addition to supporting the masts 160, annular ring plate member 82 and the corresponding inner plate portions of gates 52 and 54 may cover a portion of the excavated ground surface of an excavated root ball. Thereby, the plate member 82 and corresponding portions of the gates 52, and 54 may at least partially support and retain the root ball within the annular ring assembly 50 and blades 40 when the annular ring assembly 50 and excavated tree are tilted rearward. Chains and/or ropes may also be used to further secure the tree.

The ring 50 and/or the frame 20 may be tilted selectively rearward relative to the prime mover, and/or left or right about base centerline 12, to accommodate positioning the tree as needed during transport. To tilt the tree left or right, each base member may be pivoted independently relative to the other base members to elevate the selected left or right side higher or lower than the other side. Such positioning may be desirable in excavating trees with non-uniform weight distributions around the circumference of the upper portion of the tree, or to traverse uneven ground surfaces.

To replant the tree, the tree excavation process is substantially reversed, by positioning the root ball over a pre-formed hole in the ground and actuating tilting cylinders 56, 58 to up-right the tree to a plumb/vertical tree trunk position. Elevating cylinders 22, 24, 67, and 69 may be actuated to pivot base supports 31, 32, and 62 with respect to the frame 20, to cause the tree, root ball, plurality of blades, annular ring assembly and frame to move downward relative to the ground, and lower the root ball into the preformed hole. Wheels 33, 34 and 64 may facilitate rollability of the base supports 31, 32, and 62. The over-center neck mechanism 61 may be pivotally connected to front rolling members 64, such as by pivot 66, and to support frame 20, such as by pivot 68. Thereby, the over-center neck mechanism may permit the frame 20 and ring 50 to be lowered and raised relative to the front base support 62. The over-center neck mechanism and the left and right rear base members may be each selectively operated independently of the each other to accommodate tilting the ring 50 and frame 20 left and right, as well as rearward and forward. In addition, the ring 50 may be pivoted rearward and forward with respect to the frame 20, as needed to facilitate transporting the tree and tree mover 10 over uneven terrain.

Thereafter, each of the plurality of hydraulic blade movers 140 may be actuated to retract each of the plurality of ground piercing blades from under the root ball. Each slot engagement member 148 may move from the lower slot 154 to the upper slot 156 to engage upper slot engagement surface 157, and thereby begin retracting each of the plurality of blades 42 from under the root ball. The retracting movements may be repeated in step-by-step fashion by moving engagement member 148 from keel slot to keel slot until the blade 42 is fully retracted and the tree deposited in the hole. During blade retraction, slot engagement member 148 may be moved laterally through receiving profile 152 of each profile 150 engaged by the engagement member 148.

A prime mover 90 may be engaged with the tree mover to provide power for maneuvering the tree mover 10 and for transporting the tree and tree mover. The prime mover may comprise a truck vehicle, whereby an over-center neck mechanism may be mounted on a portion of the truck, such as illustrated in FIGS. 1–5. The prime mover 90 may be selectively connected to and disconnected from the tree mover 10, or fabricated as an integral part of the tree mover apparatus 10.

A wide variety of prime movers may be connected to or engaged with the tree mover 10. For example, the prime mover 90 may include an axle and wheel supported power unit pivotally or articulatedly engaged with the tree mover 10, such as commonly found on large scrapers or earthmovers.

A hydraulic power unit 190 may also be provided to power the hydraulic cylinders, such as the tilting, elevating, and blade moving cylinders. The hydraulic power unit 190 may be secured to the support frame 20, such as on support member 129, on the front rollable base support 60, or with the prime mover 90.

The tree mover 10 may transport trees selectively positioned at substantially unlimited attitudes, inclinations, or angles, with respect to the base or ground. The tree mover 10 preferably does not have a nesting position in which the tree is positioned for moving. Tree positioning is selective and variable during transportation, excavation, and replanting. The apparatus may be selectively pivoted to a side, forward, or rearward.

In alternative embodiments, a second ring may be positioned within the frame 20. The second ring may be pivotally engaged with the frame 20 and the ring 50 supporting the blades. Pivots for the second ring may be positioned circumferentially at an angle with respect to the position of pivots 72 and 74, such that the annular ring 50 may be gimbaled.

To transport relatively large or heavy trees that are highly inclined rearward, a removable rear support member, such as a beam or bar, may be positioned between and engaged with rear base members 31 and 32 to support a portion of the tree thereon. Such support member may provide for selective support height to accommodate a variety of tree sizes and angles of inclination. In addition, a trailing dolly may be connected to the tree mover to support a portion of the tree thereon.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. An apparatus for excavating and transplanting a tree, comprising:
    a moveable base having a centerline generally aligned with a prime mover for moving the apparatus, the base including a left side rollable base support on a respective left side of the base centerline and a right side rollable base support on a respective right side of the base centerline;
    a support frame pivotally connected to the left side and the right side rollable base supports;
    an annular ring assembly pivotally supported on the support frame, the annular ring assembly including one or more rearward pivotal gate sections for positioning the annular ring assembly circumferentially around the tree;
    a plurality of ground piercing blades circumferentially arranged about the annular ring assembly, each blade tapered laterally toward a lower blade apex such that the plurality of blades may move into substantially circumferential engagement under the tree to sever a root ball of the tree from the ground and thereafter support the tree and root ball as the annular ring assembly and the plurality of blades are raised with respect to the base to lift the tree and root ball from the ground;
    a plurality of hydraulic blade movers each for moving a respective blade relative to the annular ring assembly;
    at least one hydraulic tilting cylinder for tilting the annular ring assembly relative to the base from a vertical tree trunk position to a rearward inclined tree trunk position; and
    at least one hydraulic elevating cylinder for raising and lowering the annular ring assembly relative to the base.

2. The apparatus defined in claim 1, wherein the at least one hydraulic tilting cylinder further comprises:
    a left side hydraulic tilting cylinder and a right side hydraulic tilting cylinder, each hydraulic tilting cylinder having one end attached to the annular ring assembly and an opposing end attached to the support frame.

3. The apparatus defined in claim 1, wherein the annular ring assembly tilts in a rearward inclined tree trunk position of at least 45 degrees relative to the vertical tree trunk position.

4. The apparatus as defined in claim 1, further comprising:
    a left side annular ring pivot; and
    a right side annular ring pivot positioned opposite the left side annular ring pivot relative to the base centerline, the left side annular ring pivot and the right side annular ring pivot pivoting the annular ring rearward relative to the prime mover.

5. The apparatus defined in claim 4, wherein the moveable base comprises:
    the left side rollable base support positioned opposite the prime mover with respect to the left side annular ring pivot; and
    the right side rollable base support positioned opposite the prime mover with respect to the right side annular pivot, each of the left side and the right side rollable base supports being moveable relative to the prime mover.

6. The apparatus defined in claim 1, wherein the support frame is generally U-shaped having a right side leg on a right side of the base centerline, a left side leg on a left side of the base centerline, and a rearward opened portion to position the support frame around a tree trunk.

7. The apparatus defined in claim 1, further comprising:
    an over-center neck mechanism having one end pivotally attached to the support frame; and
    at least one over-center neck hydraulic cylinder for pivoting the over-center neck mechanism relative to the support frame to elevate the support frame relative to the base.

8. The apparatus defined in claim 7, wherein:
    the moveable base comprises a front rollable base support; and
    the over-center neck mechanism is pivotally attached at the opposing end to the front rollable base support.

9. The apparatus defined in claim 7, wherein the at least one hydraulic elevating cylinder includes a pair of hydraulic elevating cylinders positioned on opposite sides of the base centerline, each of the pair of hydraulic elevating cylinders having one end attached to the over-center neck mechanism and an opposing end attached to the support frame.

10. The apparatus defined in claim 1, wherein:
    each of the plurality of blades includes a longitudinal keel along a length of the blade and including a plurality of keel slot profiles spaced along the length of the longitudinal keel;
    each of the plurality of hydraulic blade movers is a hydraulic blade cylinder removably engaged at one end to one of the plurality of keel slot profiles in a respective longitudinal keel, an opposing end of the hydraulic blade cylinder pivotable with respect to the annular ring assembly to move the respective blade relative to the annular ring assembly in a step by step manner by moving the one end of the hydraulic blade cylinder from one keel slot profile to another keel slot profile; and
    each of the plurality of keel slot profiles includes a receiving profile for laterally receiving the one end of the hydraulic blade cylinder, a lower slot extending down from the receiving profile and having a lower engagement surface for engaging the one end of the respective hydraulic blade cylinder when the blade cylinder is moving the respective blade under the tree, and an opposing upper slot extending upward from the receiving profile and having an upper engagement surface for engaging the one end of the hydraulic blade cylinder when the hydraulic blade cylinder is moving the respective blade from under the tree.

11. The apparatus defined in claim 10, wherein:
    each of the longitudinal keels are positioned along a length of a respective blade and radially inside a circumference formed by the plurality of ground piercing blades.

12. An apparatus for excavating and transplanting a tree, comprising:
    an annular ring assembly including one or more rearward pivotal gate sections for positioning the annular ring assembly circumferentially around the tree;

a plurality of ground piercing blades circumferentially arranged about the annular ring assembly, each blade tapered laterally toward a lower blade apex such that the plurality of blades may move into substantially circumferential engagement under the tree to sever a root ball of the tree from the ground and thereafter support the tree and root ball as the annular ring assembly and the plurality of blades are raised with respect to the base to lift the tree and root ball from the ground;

a plurality of hydraulic blade movers each for moving a respective blade relative to the annular ring assembly;

a longitudinal keel along a length of each blade and including a plurality of keel slot profiles spaced along the length of the longitudinal keel;

each of the plurality of hydraulic blade movers is a hydraulic blade cylinder removably engaged at one end to one of the plurality of keel slot profiles in a respective longitudinal keel, an opposing end of the hydraulic blade cylinder pivotable with respect to the annular ring assembly to move the respective blade relative to the annular ring assembly in a step by step manner by moving the one end of the hydraulic blade cylinder from one keel slot profile to another keel slot profile; and each of the plurality of keel slot profiles includes a receiving profile for laterally receiving the one end of the hydraulic blade cylinder, a lower slot extending down from the receiving profile and having a lower engagement surface for engaging the one end of the respective hydraulic blade cylinder when the blade cylinder is moving the blade under the tree, and an opposing upper slot extending upward from the receiving profile and having an upper engagement surface for engaging the one end of the hydraulic blade cylinder when the blade cylinder is moving the respective blade from under the tree.

13. The apparatus defined in claim 12, wherein:

each of the longitudinal keels are positioned along a length of a respective blade and radially inside a circumference formed by the plurality of ground piercing blades.

14. The apparatus defined in claim 12, further comprising:

a moveable base having a centerline generally aligned with a prime mover for moving the apparatus, the base including a left side rollable base supports on a respective left side of the base centerline and a right side rollable base supports on a respective right side of the base centerline; and at least one hydraulic elevating cylinder for raising and lowering the annular ring assembly relative to the base.

15. The apparatus defined in claim 14, further comprising:

a support frame pivotally supporting the annular ring assembly thereon for tilting the annular ring assembly rearward relative to the support frame, the support frame pivotally connected to the left side and the right side rollable base supports.

16. A method of excavating and transplanting a tree, comprising:

providing a moveable base having a centerline generally aligned with a prime mover for moving the tree, the moveable base including a left side rollable base support on a left side of the base centerline and a right side rollable base support on a right side of the base centerline;

pivotally connecting a support frame to the base;

pivotally supporting an annular ring assembly on the support frame, the annular ring assembly including one or more rearward pivotal gate sections;

moveably supporting a plurality of ground piercing blades circumferentially about the annular ring assembly;

mounting a plurality of blade movers each to the annular ring assembly at one end and at an opposing end to a respective one of the plurality of blades to move the blade with respect to the annular ring assembly;

opening the one or more gate sections;

thereafter positioning the annular ring assembly around the tree;

thereafter closing the one or more gate sections;

thereafter actuating the plurality of blade movers to move the plurality of blades into the ground and sever a root ball of the tree from the ground;

thereafter actuating an elevating cylinder to raise the annular ring assembly relative to the base, thereby raising the tree and root ball supported by the plurality of blades;

actuating a tilting cylinder to tilt the annular ring assembly relative to the base from a vertical tree trunk position to a rearward inclined tree trunk position; and transporting the tree and root ball for subsequent transplantation.

17. The method defined in claim 16, further comprising:

pivotally attaching one end of an over-center neck mechanism to the support frame; and pivoting the over-center neck mechanism relative to the support frame to elevate the support frame relative to the base.

18. The method defined in claim 16, wherein actuating the a tilting cylinder to tilt the annular ring further comprises:

tilting the annular ring relative to the base from a vertical tree trunk position rearward at least 45 degrees relative to the vertical tree trunk position.

19. The method defined in claim 16, further comprising:

while the annular ring assembly is tilted relative to the base, adjusting the elevation of the annular ring assembly relative to the base to a selected minimum ground clearance between the tilted and raised annular ring assembly and a ground surface.

20. The method defined in claim 16, wherein mounting a plurality of blade movers further comprises:

providing a longitudinal keel along a length of each of the plurality of blades, each longitudinal keel including a plurality of keel slot profiles along a length of the longitudinal keel;

providing each of the plurality of keel slot profiles with a receiving profile, a lower slot extending down from the receiving profile, and an opposing upper slot extending upward from the receiving profile;

pivotally attaching an end of each hydraulic blade mover to the annular ring assembly to move the plurality of blades relative to the annular ring assembly in a step by step manner by moving the one end of the hydraulic blade cylinder from one keel slot profile to another keel slot profile; and laterally moving an opposing end of each of the plurality of hydraulic blade movers through a selected receiving profile in a respective longitudinal keel to removably engage a respective one of the plurality of keel slot profiles.

* * * * *